United States Patent [19]

Steck

[11] Patent Number: 4,677,584

[45] Date of Patent: Jun. 30, 1987

[54] DATA PROCESSING SYSTEM WITH AN ARITHMETIC LOGIC UNIT HAVING IMPROVED CARRY LOOK AHEAD

[75] Inventor: Christopher W. Steck, Grand Coteau, La.

[73] Assignee: Texas Instruments Incorporated, Dallas, Tex.

[21] Appl. No.: 556,484

[22] Filed: Nov. 30, 1983

[51] Int. Cl.[4] .............................................. G06F 7/50
[52] U.S. Cl. .................................................. 364/784
[58] Field of Search ................. 364/768, 784, 786–788

[56] References Cited

U.S. PATENT DOCUMENTS

| | | | |
|---|---|---|---|
| 3,553,446 | 1/1971 | Kruy | 364/788 |
| 3,700,875 | 10/1972 | Saenger et al. | 364/787 |
| 3,987,291 | 10/1976 | Gooding et al. | 364/787 |
| 4,425,623 | 1/1984 | Russell | 364/787 |
| 4,442,498 | 4/1984 | Rosen | 364/787 |
| 4,471,455 | 9/1984 | Dshkhunian et al. | 364/786 |
| 4,514,696 | 4/1985 | Genrich | 364/786 |
| 4,525,797 | 6/1985 | Holden | 364/788 |

OTHER PUBLICATIONS

Willette et al., "Binary Adder", *IBM Technical Disclosure Bulletin*, vol. 6, No. 4, pp. 39–40, Sep. 1963.

*Primary Examiner*—Archie E. Williams
*Assistant Examiner*—Dale M. Shaw
*Attorney, Agent, or Firm*—Robert D. Marshall, Jr.; Richard K. Robinson; Rodney M. Anderson

[57] ABSTRACT

A data processing system has an arithmetic logic unit that includes a plurality of summation units for summing an ADDEND with a AUGEND to obtain a first signal that represents the summation of the ADDEND, AUGEND and a CARRY IN. Each summation units also provides a second signal that represents the carry of the summation of the ADDEND and the AUGEND. The plurality of summation units are arranged in a second plurality of groups of less than a third preselected number of summation units with over to the carry in such that each member group has a carry a serial connection of the carry in for receipt of a carry out from a preceding group's carry out. Interdisposed between the groups is a fourth plurality of carry boost units for boosting the second signal of a preceding group prior to application to a following group.

Each summation unit includes a carry advance node which is driven to a predetermined voltage when the ADDEND and AUGEND do not indicate a carry propagate condition. The carry advance nodes of the summation units within each group are coupled, together. A carry advance circuit detects when the coupled carry advance nodes are not at the predetermined voltage, indicating that all the summation units provide a carry propagate condition. In this event the carry in of the group of summation units is applied to the carry in of the next group of summation units overriding the output of the carry boost circuit. A similar carry backward circuit operates under the same conditions to apply the carry in of the group of summation units to the carry out of that group.

1 Claim, 7 Drawing Figures

DATA PROCESSING SYSTEM WITH AN ARITHMETIC LOGIC UNIT HAVING IMPROVED CARRY LOOK AHEAD

BACKGROUND OF THE INVENTION

This invention relates to data processing systems, and in particular, to the arithmetic logic unit of the data processing systems and even more particularly to a carry look ahead, both forwards and backwards, for an arithmetic logic unit.

A major limitation in the use of field effect transistor circuits and in particular, large scale integrated circuits, is the restriction associated with extending the dynamic logic circuits, such as those found in an arithmetic logic unit, to high speed applications due to the necessity of multiple clocks that are required for the implementation of logic circuits with field effect transistors. An additional limitation is propagation delays associated in the arithmetic logic units that are associated with data processing systems and in particular, with microprocessors, is the delays encountered through the implementation of the carry signals during an addition operation.

The minimization of time in a data processing system such as a microprocessor system that is required to implement a mathematical function in the arithmetic logic unit may be reduced from many processing cycles of the microprocessor to a relatively few number of processing cycles through the implementation of the carry forward and backward arithmetic logic unit as disclosed herein.

SUMMARY OF THE INVENTION

A data processing system with an arithmetic logic unit that includes a plurality of summation means for summing an ADDEND with a AUGEND to obtain a first signal that represents the summation of the ADDEND, AUGEND and a CARRY IN. Each summation means also provides a second signal that represents the carry of the summation of the ADDEND and the AUGEND. The plurality of summation means are arranged in a second plurality of groups of less than a third preselected number of summation means with a serial connection of the carry out to the carry in such that each member group has a carry in for receipt of a carry out from a preceding group's carry out. Interdisposed between the groups are a fourth plurality of carry boost means for boosting the second signal of a preceding group prior to application to a following group. A carry advance means advances the second signal from the carry in of a preceding group to the carry out of a following group.

In multiple level arithmetic logic circuits such as arithmetic logic units, performance is enhanced in the speed of operation by the implementation of an accelerated carry forward and backwards logic circuit.

The carry advance means for the arithmetic logic units provides for feed forwarding the carry signal of a preceding group to the output of the carry advance means located between the preceding group and the following group.

The arithmetic logic unit for the data processing system additionally includes a second feed forward means for selected preceding groups and the following groups for forwarding a second signal to the input of the carry boost means located between the selected preceding groups and their following groups.

The data processing system includes a plurality of summation means which are exclusive OR for obtaining the exclusive OR of the ADDEND and the AUGEND and a carry means for providing the second signal when both the ADDEND and AUGEND are logic ones.

These embodiments as well as advantages and objectives of the invention, may be obtained from the reading of the specification with the figures. Dr

DETAILED DESCRIPTION OF THE PREFERRED EMBODIMENT

Figure 1:
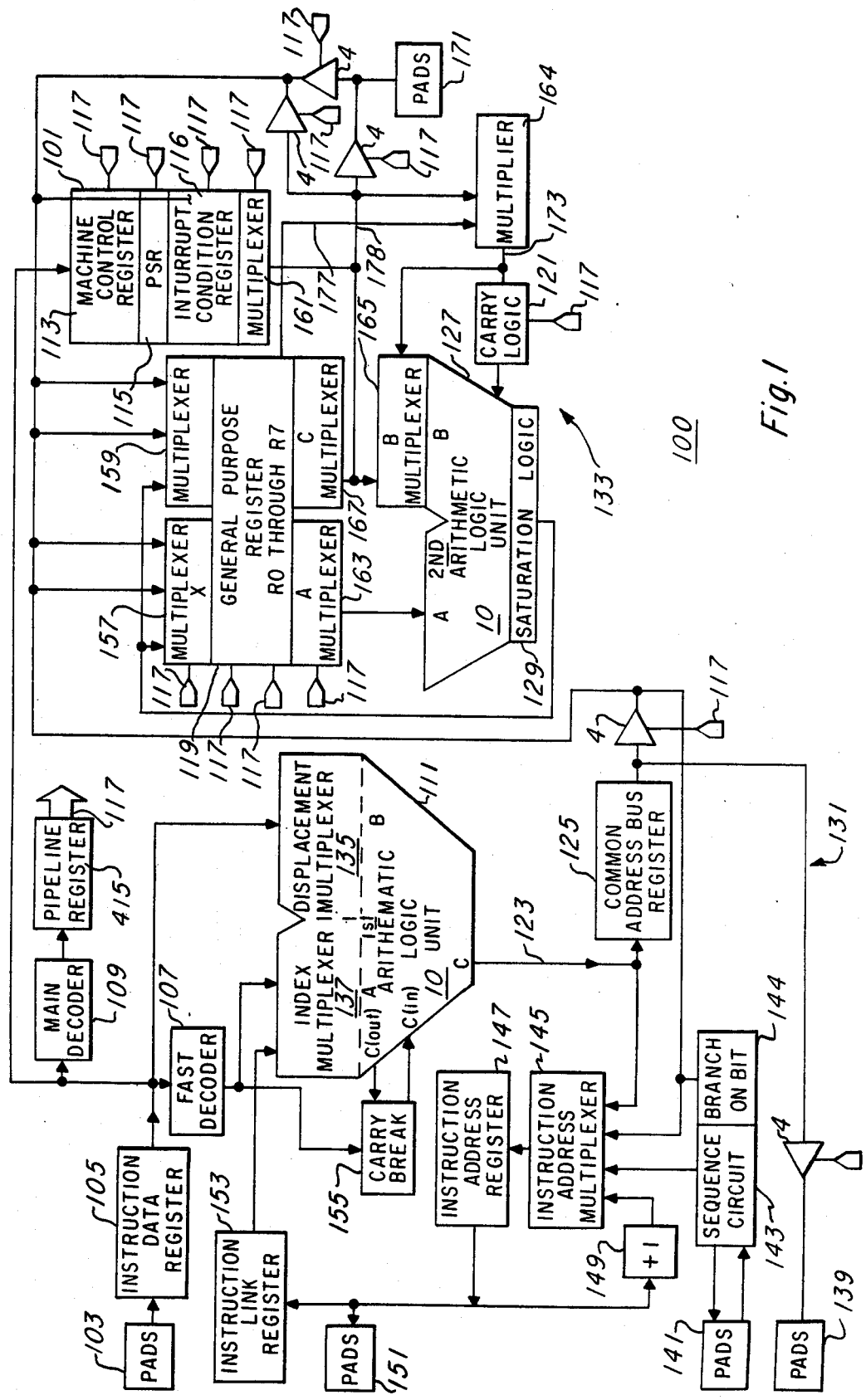
FIG. 1 is a block diagram of a microprocessing system incorporating the arithmetic logic unit according to the invention.

In FIG. 1, there is illustrated a microprocessor which incorporates arithmetic logic units 111 and 127 according to the invention. Instructions from an I/O terminal (not shown) are provided via the pads 103 to an instruction data register 105 and are then applied to a fast decoder 107, a main decoder 109, and the address arithmetic logic unit 111. The main decoder 109 decodes the instructions into control signals which are used throughout the microprocessor. These control signals are stored in the control pipeline register 115 which conveys the decoded signals via data bundle 117 to the appropriate circuitry.

The microprocessor 100 has essentially two portions, an instruction portion represented in the area of 131 and a data portion represented in the area of 133. The address arithmetic logic unit 111 receives data from the instruction data register 105 via a displacement multiplexer 135 as well as data from the instruction link register 153 or the general purpose register 119 via the index multiplexer 137, based on the results of the fast decoder 107.

After the appropriate arithmetic operation is performed as directed by the carry break logic 155, the output 123 of the address arithmetic unit 111 is latched in the common address bus register 125. The output of this register may subsequently be applied to the I/O of the integrated circuit via pads 139 to address either the data memory or input/output address space or to an internal bus for use as a constant. The output 123 of the address arithmetic unit is also applied to the instruction address multiplexer 145. The output of this multiplexer is latched in the instruction address register 147. Another input to the multiplexer, an incremented version of the instruction address register, is provided by the increment by one device 149. The control of multiplexer 145 is provided by the sequencing circuit 143. The sequencing circuit 143 controls branches and interrupts which may be received via the pads 141. The output of the instruction address register 147 is interfaced to external devices (not shown) via pads 151 for addressing an instruction in memory. The instruction address register 147 is also latched in the instruction link register 153 after a one-cycle delay.

The arithmetic logic unit 127 receives data from a general purpose register 119 via the A multiplexer 163 and data from a general purpose register 119, machine control register 113, Program Status Register 115 (PSR), or Interrupt Condition Register 116 (ICR) via the C multiplexer 167 or the multiplier 161 via the B multiplexer 165. The carry into the arithmetic logic unit 127 is from the carry logic 121 under the control of the main decoder. The output of arithmetic logic unit 127 may be adjusted in the case of an overflow by the saturation logic 129. The output is then fed back to the general purpose registers 119 via the X and Y multiplexers 157 and 159, respectively.

When an instruction calling for a multiplication is decoded by the main decoder 107, the multiplier 161 performs this task and the result latched in registers internal to that block.

Both the first arithmetic logic unit 111 and the second arithmetic logic unit 127 include an arithmetic logic unit 10 (FIG. 2) that has an ADDEND input A and an AUGEND input B and provides on its output C the summation of the ADDEND and the AUGEND. Additionally, arithmetic logic units 111 and 127 receive a carry input from the carry logic 155 and 127 respectively, and the arithmetic logic unit 111 provides a carry out to the carry break circuit 155.

Figure 2:
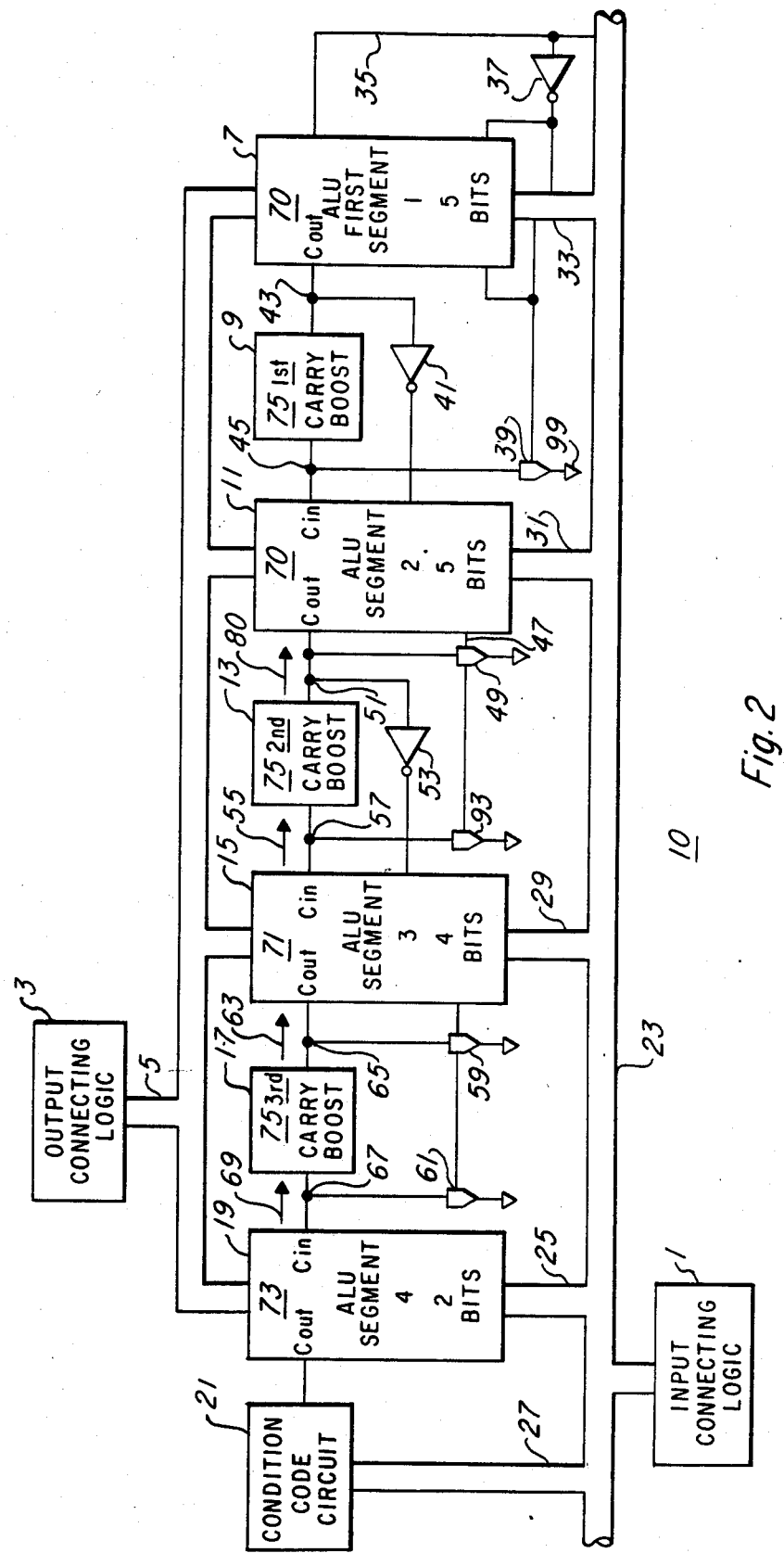
FIG. 2 is a block diagram of the arithmetic logic unit according to FIG. 1.

FIG. 2 is a block diagram of the arithmetic logic unit used to implement the first arithmetic logic unit 111 and the second arithmetic logic unit 127 of FIG. 1 and includes a four different segments of the arithmetic logic unit. The first and second segments are five-bit segments arithmetic logic units 70 whereas the third is a four-bit arithmetic logic unit and the fourth segment is a two-bit arithmetic logic unit 73. Between each segment is a carry boost circuit 75 which is used to boost the carry out in power so that it may drive additional circuits that are contained in the following logic unit. The arithmetic logic unit 10 receives its input from an input connecting logic 1 such as the index multiplexer 137 or the displacement multiplexer or the B multiplexer 135 and applies the data which includes the two numbers that are to be summed together to the arithmetic logic unit 10 via data bundle 23. The output is provided to the output connecting logic 3 which may be any of the connecting logics illustrated in FIG. 1 and the connection thereto being made via conductor bundle 5. The first segment 70 additionally receives the carry in input via data line 35 and provides a carry out output to node 43, based upon the summation of the data bits that are provided to the first segment 7, via data bundle 33. A logic one on the look ahead carry output is used to gate the transistor 39 connecting node 45 to reference a potential as indicated by the arrow 99 and thus the carry is fed forward to node point 45 where it will proceed the carry out's output that is provided from the first segment 7 to node 43. Node 43 is also connected to an inverting amplifier 41 which inverts the logic state at node point 43 and applies it via the look ahead carrying input of the second segment 11 to the transistor switches 49 and 93. The two transistors 49 and 93 are turned on under carry look ahead conditions and will cause the node points 51 and 57 to be connected to respective reference potentials as indicated by the arrows 55 and 80 to provide an indication of the carry from the node point 43 through the second segment 11. This provides feed forward to not only the second segment 11 but also via second segment 11 to the second carry boost 13. In a similar fashion, amplifier 53 is connected to transistors 59 and 61 via third segment 15 which will cause node points 65 and 67 to be dependent on the logic state at node point 51 and the carry look ahead state of the third segment 15, and to reflect a feed forwarding of the carry signal that is present at the node point 51 to not only the third segment 15 and fourth segment 19 but also to the third carry boost circuit 75. The final carry out signal is applied to a condition code circuit 21 which indicates that there is an additional carry provided from the fourth segment 19.

Figure 3:
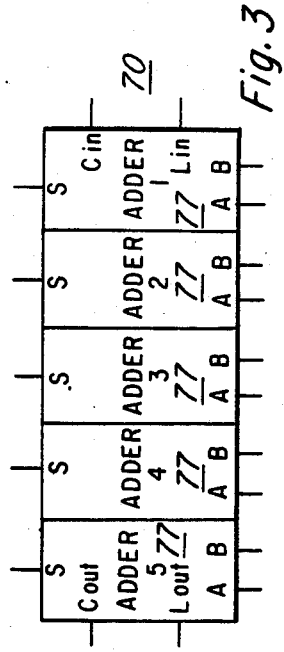
FIGS. 3, 4 and 5 are block diagrams of the groups used to configure the arithmetic logic unit of FIG. 2.
Figure 4:
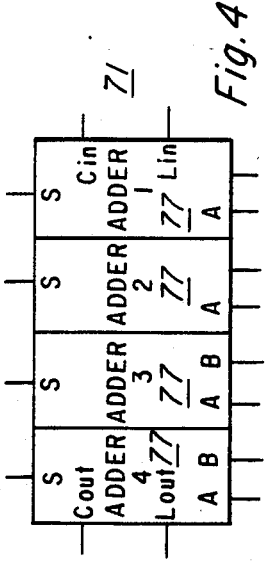
Figure 5:
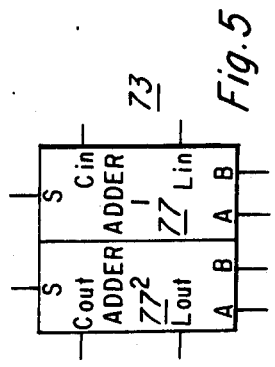

FIG. 3 is a block diagram of the five-bit arithmetic logic unit 7 which provides for receiving the ADDEND at terminal A for each bit and the AUGEND at B terminal of an adder 77 with the summation being provided on the S terminal; a carry out on the "C out" terminal and a carry in to be provided on the "C in" terminal. Terminals L-IN and L-OUT are paths for the carry feed forward circuit that passes through each segment. In a similar matter, the four-bit arithmetic logic unit 71 is illustrated in FIG. 4, and the two-bit arithmetic logic unit 73 is illustrated in FIG. 5.

Figure 6:
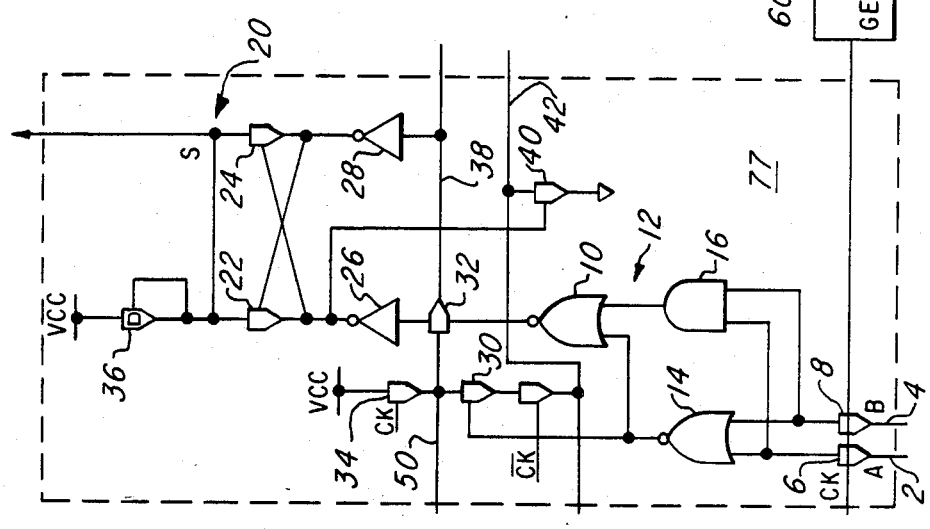
FIG. 6 is a schematic diagram of the individual summation circuits used within the groups of FIGS. 3, 4 and 5.

FIG. 6 is a schematic diagram of an adder stage 77 and includes an exclusive OR stage 12 plus an exclusive NOR stage 20. The exclusive OR stage receives the ADDEND and the AUGEND via terminals 2 and 4 respectively, and applies them to a NOR gate 14 and to an AND gate 16 via transistor switches 6 and 8 respectively. The transistor switches 6 and 8 are driven by a clock generator 60 which provides clock pulses for use throughout arithmetic logic unit 11 but which normally is part of the data processing system such as that shown in FIG. 1, and not part of the arithmetic logic unit. The output of the AND gate 16 and the output of the NOR gate 14 are applied to a second NOR gate 10. Additionally, the output of the NOR gate 14 is used to indicate a carry signal on data line 50 by the gating of the transistor switch 30. Data line 50 is precharged by a clock from the clock generator 60 gating the transistor 34 and applying Vcc, from a source not shown, to the data line 50 which is the indication of a carry signal, is precharged and then conditionally discharged depending on the output of the NOR gate 14. An exclusive NOR stage 20 sums the output of the NOR gate 18 with the carry in that is provided on conductor 38 and provides for the gating of field effect transistor 32 connecting the data line 38 to data line 50 as well as providing an indication on inverter 26. The output of inverter 26 controls transistor 40. Transistor 40 connects line 42, which serves as the L-IN and L-OUT of adder stage 77, to a reference potential when actuated. The data that is on data line 38 is inverted by inverting amplifier 28 and applied to the logic circuit that includes the cross-coupled transistor switches 22 and 24 with the output being provided on the S terminal indicating the summation of the ADDEND, the AUGEND and the CARRY IN. Depletion field effect transistor 36 is used to bias the exclusive OR circuit by connecting and slowly depleting Vcc from a source not shown to the exclusive OR circuit 20.

Figure 7:
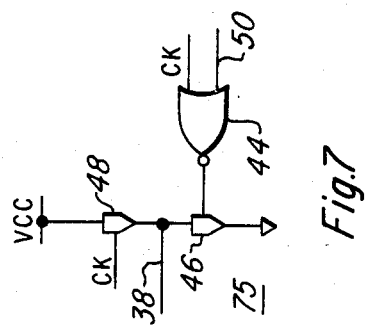
FIG. 7 is a schematic diagram of the carry boost circuit of FIG. 2.

Because the field effect transistors for speed and accuracy, can only drive a few or minimal number of loads, each group or segment 70 or 71 or 73, as shown in FIG. 7, is separated from its neighbor by carry boost circuit 75 which includes a NOR gate 44 that is clocked by a clock signal from the clock generator 60 of FIG. 6, and will provide the signal that is on conductor 50 to the field effect transistor switch 46 which connects data line 38, given a logic zero on conductor 50 to the reference voltage. The data line 38 is precharged by field effect transistor 48 being clocked with a signal from the clock generator 60.

Although the present invention has been described in relation to a specific preferred embodiment, it will be clearly understood by those skilled in the art that other optional features may be included within the multiplier or substituted for features described without departing from the scope of the invention.

What is claimed is:

1. A data processing system having an arithmetic logic unit comprising:

a plurality of summation units (77), each having an addend input terminal (2), an augend input terminal (4), a carry input terminal (38), a summation output terminal (S) and a carry output terminal (50), each summation unit for receiving digital input signals on said addend input terminal, said augend input terminal and said carry input terminal and for generating digital output signals upon said summation output terminal and said carry output terminal representative of the sum of said received digital input signals, said summation output terminal communicating the digital output signal generated thereupon to the remainder of the data processing system, each summation unit further including a carry advance node (42), an exclusive OR circuit (12) connected to said addend input terminal and said augend input terminal for generating an carry propagate output signal when the digital input signals of said addend input terminal and said augent input terminal differ, and a carry switch (40) controlled by said carry propagate output signal for coupling said carry advance node to a first predetermined voltage in the absence of said carry propagate output signal;

said plurality of summation units disposed sequentially in a plurality of arithmetic logic unit segments (7, 11, 15, 19), said carry output terminal of each summation unit connected to said carry input terminal of the next sequential summation unit within each of said arithmetic logic unit segment, and said carry advance node of each summation unit coupled to said carry advance node of each other summation unit within each arithmetic logic unit segment;

a plurality of carry boost circuits, each having an input terminal connected to the carry output terminal of the last sequential summation unit of an arithmetic logic unit segment and having an output connected to the carry input terminal of the first sequential summation unit of the next sequential arithmetic logic unit for boosting the power of said carry output; and a plurality of carry advance circuits, each including an inverter having an input connected to said carry input terminal of said first sequential summation unit of an arithmetic logic unit segment and an output connected to said coupled carry advance nodes of said summation units of said arithmetic logic unit segment and a carry advance switch (39, 93, 61) controlled by the voltage on said coupled carry advance nodes of said summation units of said arithmetic logic unit segment for selectively connecting a second predetermined voltage representative of a carry input signal to said carry input terminal of said first sequential summation unit of the arithmetic logic unit segment next in sequence from said arithmetic logic unit segment, wherein the carry input signal applied to the carry input terminal of said first sequential summation unit of said arithmetic logic unit segment is applied to said carry input terminal of said first sequential summation unit of said next sequential arithmetic logic unit segment if all the summation units within said arithmetic logic unit segment generate a carry propagate signal.

* * * * *